(12) United States Patent
Nelson

(10) Patent No.: US 7,036,115 B2
(45) Date of Patent: Apr. 25, 2006

(54) CODE GENERATION BY MATCHING AND SATISFIABILITY SEARCH

(75) Inventor: Charles Gregory Nelson, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 721 days.

(21) Appl. No.: 09/990,542

(22) Filed: Nov. 20, 2001

(65) Prior Publication Data

US 2002/0124239 A1    Sep. 5, 2002

Related U.S. Application Data

(60) Provisional application No. 60/260,494, filed on Jan. 8, 2001.

(51) Int. Cl.
*G06F 9/45*    (2006.01)

(52) U.S. Cl. .......................... 717/151; 706/47
(58) Field of Classification Search ........ 717/151–161, 717/104; 706/12–14, 47
See application file for complete search history.

(56) References Cited

U.S. PATENT DOCUMENTS

| | | | |
|---|---|---|---|
| 4,914,590 A | 4/1990 | Loatman et al. ............ 364/419 |
| 5,142,590 A | 8/1992 | Carpenter et al. ............ 382/14 |
| 5,481,717 A | 1/1996 | Gaboury ..................... 395/700 |
| 5,511,146 A | 4/1996 | Simar, Jr. .................... 395/24 |
| 5,515,477 A | 5/1996 | Sutherland .................. 395/27 |
| 6,289,502 B1 * | 9/2001 | Garland et al. ............. 717/104 |

OTHER PUBLICATIONS

"GNU Superoptimizer" *Proceedings of ACM SIGPLAN Conference on Programming Language Design and Implementation (PLDI)*, (1992).
Harry, Andrew "Formal Methods Fact File VDM and Z", Chapter 7, pp. 1-7, 281-291, 305-322, Sep. 1996, ISBN 047190062.
Arbib, Michael A. "The Handbook of Brain Theory and Neural Networks", pp. 17-25, 79-85, 711-715, First MIT Press, 1995, ISBN 0262011484.
Chromsky, Noam "Three Models for the Description of Language", pp. 113-124, MIT, Reprint from IRE Trans. Inform. Theory, IT-2, No. 3, 1956.
Cleaveland, R., et al., "A Front End Generator for Verification Tools", Tools and Algorithms for the Construaction and Analaysis of Systems, pp. 153-173, TACAS '95 Denmark Conference, May 1995, Springer-Verlag ISBN 354060630.

(Continued)

*Primary Examiner*—Kakali Chaki
*Assistant Examiner*—Lawrence Shrader

(57) ABSTRACT

A tool and method for automatically producing near-optimal code sequences are particularly useful for generating near-optimal code sequences in inner loops, crucial subroutines, and device drivers. As a novel functional and architectural strategy, the invention contemplates applying technologies that would be normally in automatic theorem proving to the problem of automatic code generation. The aspect of the automatic theorem proving is realized by matching followed by planning with satisfiability search. Notably also, the present invention targets a goal-oriented, cycle budget limited code sequence in producing the near-optimal code sequence.

43 Claims, 3 Drawing Sheets

OTHER PUBLICATIONS

Nelson, C.G. "Multi-Headed One-Way Automata", Notices of the American Mathematical Society, v23, n. 4, PA444, Harvard Univ., 1976.

Hehner, E.C.R. "The Logic of Programming", Series in Computer Science, TOC, pp. 1-133, 134-268, 269-362, Prentice Hall Int'l, 1984, ISBN 0135399661.

Kowalski, Robert "Logic for Problem Solving", Chapters 1-13, 1979, The Computer Science Library, Library of Congress, ISBN 0444003657.

Nelson, Charles Gregory, "Techniques for Program Verification", pp. 1-116, Stanford University PhD Thesis, 1980, Univ. Microfilms Int'l.

Nelson, Charles Gregory, "Techniques for Program Verification", pp. 1-101, XEROX Palo Alto Research Center, 1980, CSL-81-10.

Joshi, Rajeev, et al., "Denali: A Goal-Directed Superoptimizer", pp. 1-16, Compaq SRC Report, Jul. 30, 2001, http://www.research.compaq.com/SRC/.

Massalin, Henry "Superoptimizer—A Look at the Smallest Program", pp. 122-126, Proceedings of the 2nd International Conference on Architectural Support for Programming Languages and Operating Systems, SIGARCH Computer Architecture News 15(5), SIGOPS Operating System Review 21(4), SIGPLAN Notices 22(10), Oct. 5-8, 1987, Palo Alto, CA, ACM Press, IEEE-CS, ISBN 0-89791-1.

Detlefs, David "An Overview of the Extended Static Checking System", Nov. 1995, http://www.src.dec.com/SRC/personal/David_Detlefs/home.html.

Manasse, M.S. et al., "Trestle Tutorial", pp. 1-70, Digital System Research Center, Report Paper 69, May 1992.

* cited by examiner

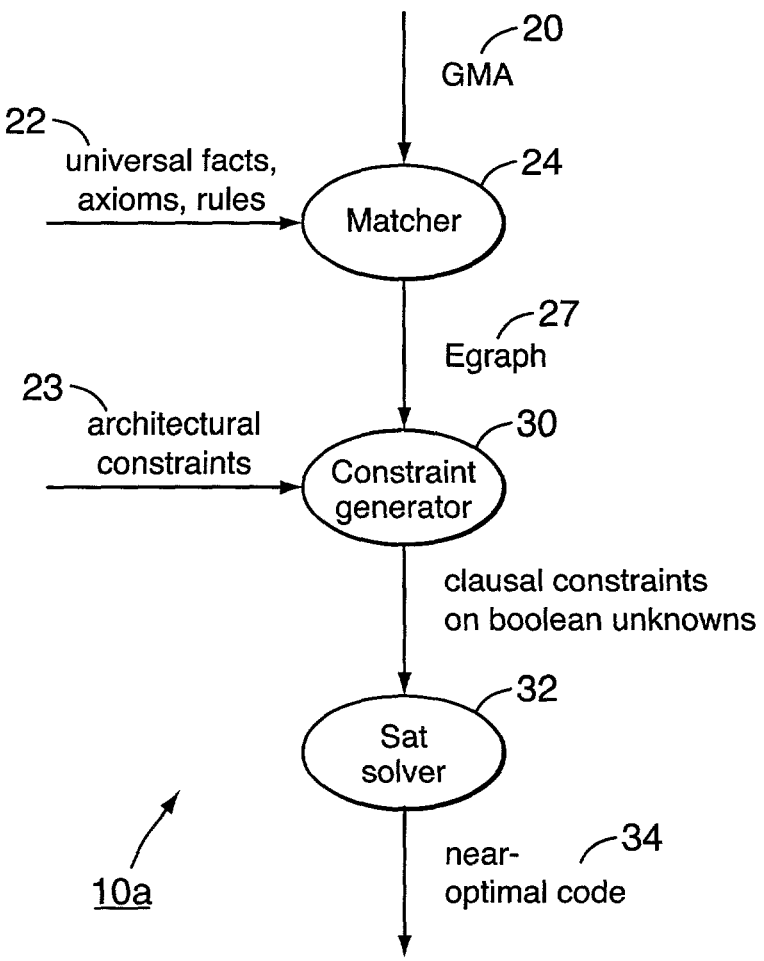
FIG. 1a
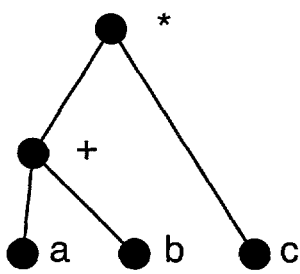
(a+b)*c      FIG. 2

Solid arrows represent term DAG edges and dashed arcs represent equivalences in this illustration of matching in the E-Graph. (DAG: Directed Acyclic Graph)

CODE GENERATION BY MATCHING AND SATISFIABILITY SEARCH

REFERENCE TO PRIOR APPLICATION

This application claims the benefit of and incorporates by reference U.S. Provisional Application No. 60/260,494, filed Jan. 8, 2001, titled "Code Generation By a Matching and Satisfiability Search".

CROSS REFERENCE TO RELATED APPLICATION

This application is related to and incorporates by reference U.S. Ser. No. 09/176,950 filed Oct. 22, 1998, now U.S. Pat. No. 6,343,376.

BACKGROUND OF THE INVENTION

1. Field of the Invention

This application relates to compilers and, specifically, to generating code sequences.

2. Background Art

Automatic code generation is as old as FORTRAN, but the code sequences produced by these standard techniques are very far from optimal. Conventional tools for automatic code generation, and even optimization, are designed as part of a compiler used in edit-compile-debug loops. Automatic code generation tools are constrained by the requirement that they be able to generate hundreds, thousands, or millions of instructions per second. Although such tools can generate indifferent code quickly they have little hope of generating code that is nearly optimal.

The only automatic code generation approaches known to aim at near optimal code are Massalin's "supercompiler" and Granlund's GNU "superoptimizer". Massalin's supercompiler uses brute-force enumeration of all possible code sequences, and is therefore glacially slow. (See: Henry Massalin, "Superoptimizer—A Look at the Smallest Program," Proceedings of the Second International Conference on Architectural Support for Programming Languages and Operating Systems (ASPLOS II), Oct. 5–8, 1987, Palo Alto, Calif., ACM Press, IEEE-CS, ISBN 0-89791-238-1; SIGARCH Computer Architecture News 15(5), SIGOPS Operating System Review 21(4), SIGPLAN Notices 22(10), pages 122–126). Introduced by Torbjorn Granlund of MIT, the GNU superoptimizer uses the same technique as Massalin's (See: ftp://prep.ai.mit.edu/pub/gnu/superopt/superopt-2.5.tar.gz). Granlund states about the GNU superoptimizer that: "[t]he superoptimizer is a function sequence generator that uses an exhaustive generate-and-test approach to finding the shortest assembly instruction sequence for a given function." Namely, conventional approaches use an exhaustive search and test of all possible code sequences to find a shorter program. For target processor architectures such as the 68000, the program found with conventional approaches is the shortest and presumably fastest, but for more complex multiple-issue architectures this may not be the case. Accordingly, to achieve better results the present invention addresses these and related issues.

SUMMARY OF THE INVENTION

In accordance with the purpose of the invention, as embodied and broadly described herein, the invention relates to a method, an apparatus (or tool) and a computer readable medium for automatically generating a near-optimal code sequence. Then, the near-optimal code sequence can be more efficiently executed on a computer (or processor).

In one embodiment, the method is directed to producing a near-optimal code sequence for a program fragment to be executed on a target computer. Notably, the present invention applies automatic theorem-proving techniques to a code sequence generator for the automatic generation of a near-optimal code sequence. The method in accordance with the present invention includes repeatedly invoking the automatic theorem proving. First, the invoked theorem proving determines a minimum cycle budget that is the lowest of the cycle budgets K for which a formalized mathematical conjecture that no code sequence for the target computer architecture executes the program fragment within the cycle budget K is unprovable by the automatic theorem prover. Having determined the minimum value of K, the automatic theorem prover extracts the near optimal code from a counterexample implicit in the failed proof of the formalized mathematical conjecture for that minimum which is the optimal number of cycles.

The automatic theorem proving includes performing matching followed by planning with a satisfiability search. The matching produces a number of possible plans for creating the near-optimal code sequence. The planning selects an optimal plan from among the possible plans discovered via the matching. The outcome of the method is automatic generation of a near optimal code sequence.

It is noted that to require a user to prepare a bank of tests for each fragment of code to be generated, as for example the aforementioned conventional superoptimizer does, is painfully onerous. Advantageously, in accordance with the present invention the above-described approach requires simply the introduction of inputs as it otherwise would introduce to a conventional code generator (without requiring these tests). Moreover, code sequences that pass test are not necessarily correct code sequences. The conventional superoptimizer produces output that must be studied carefully for correctness. Advantageously, the present invention produces output that is correct by definition.

In addition, the aforementioned conventional supercompiler appears to have the limitation that it is capable of producing only register-to-register computations and no memory stores, since executing random code could have undesirable effects. The enumeration of code sequences must be such that executing the candidate instructions does not crash the program or interfere with the code generation. Advantageously, the present invention does not have these supercompiler limitations.

Furthermore, brute-force enumeration of all code sequences is glacially slow. As mentioned, the conventional supercompiler is capable of finding short code sequences. But, in addition to being extremely slow (possibly taking a week to complete) this approach produces sequences limited to only few instructions (about half-a-dozen). Advantageously, the present invention replaces the brute-force enumeration with goal-directed search. The use of goal directed search provides a significant gain in efficiency. For example, in accordance with the present invention, an overnight run may produce an optimal sequence of several dozen instructions.

In addition to the method, the invention provides a computer program product with a computer readable medium. The computer readable medium embodies program code configured to cause a computer to similarly produce the near-optimal code sequence.

In another embodiment, the invention provides a tool for automatically generating near optimal code sequence. The input to this tool is capable of receiving a multi-assignment. The tool further includes a matcher responsive to the multi-assignment and producing via matching a number of possible plans for creating the near-optimal code sequence. The tool also includes a planner configured to select via a satisfiability search an optimal plan from among the possible plans discovered by the matcher. The code sequence generation tool is configured to invoke the matcher and the planner thereby implementing an automatic theorem-proving for automatically generating the near-optimal code sequence. Moreover, the code sequence generation tool can be further configured for producing the optimal code sequence using a goal-oriented, cycle budget limited code sequence in generating the near-optimal code sequence.

The advantages of the invention will be further understood by those skilled in the art from the description that follows. As well, advantages of the invention will be realized and attained from practice of the invention disclosed herein.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

FIGS. 1a and 1b illustrate the automatic code generator and code generation process, respectively.

FIG. 2 illustrates a term graph representing expressions.

DETAILED DESCRIPTION OF THE INVENTION

Figure 1B:
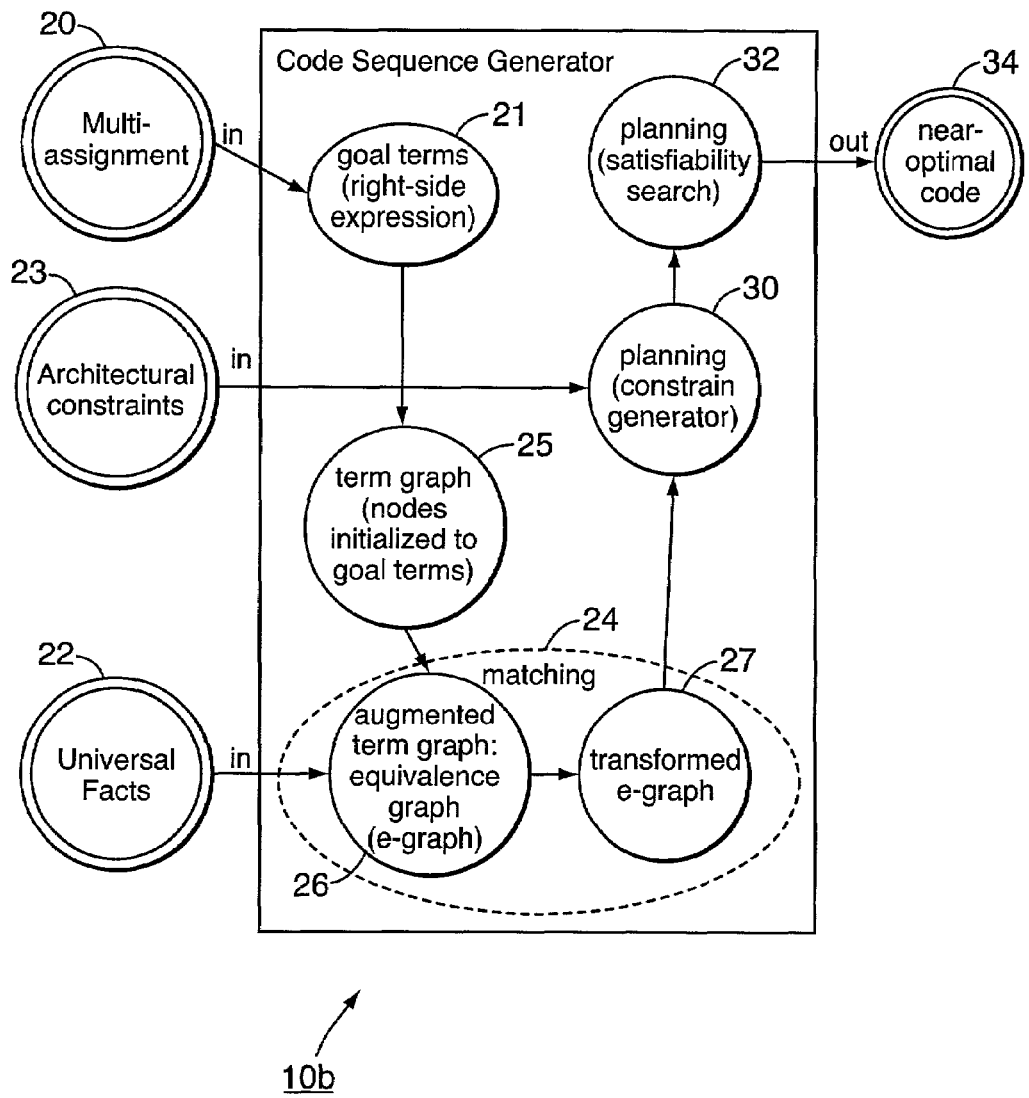

The present invention relates to generating code sequences and, specifically, to generating near-optimal code sequences. It is often the case that the best compiler available does not produce adequately efficient code and near-optimal code sequences are required. For example, near-optimal code sequences are required in inner loops, crucial subroutines, and device drivers. In these cases, current engineering practice is to manually code the required sequences in assembly language, allocating scarce engineering talent to the task.

Generally, the goal of the invention is to produce a solution that will be more effective and useful in these situations. For example, the goal of the present invention is to address the problem of automating the tedious backtracking search to find a straight-line code schedule that computes a given vector of expressions in the minimum number of cycles. In doing an optimal job of common subexpressions elimination, the invention is designed to consider the target architecture, multiple-issue architecture restrictions, latency constraints of memory and other functional units and the like.

The invention provides a new way for generating near-optimal code sequences that, although useful for any computer (or processor), is particularly useful for computers with modem architectures like the Alpha™ or the Itanium™ ("Alpha" is a trademark of Compaq Computer Corporation, Houston Tex.; Itanium is a trademark of Intel Corporation of Santa Clara, Calif.). The invention can be put into practice in a number of ways, including a method, a tool and a computer readable medium, that automatically generate near-optimal machine code for execution on an automatic digital computer with a target architecture.

It would seem that an automatic theorem prover is an unlikely engine to use as a code generator. Yet, as a novel functional and architectural strategy, the invention contemplates applying techniques that would normally be used in automatic theorem proving to the problem of code generation.

Namely, the present invention realizes code generation through refutation-based automatic theorem proving that is in fact a general-purpose goal-directed search engine. This goal-directed engine performs a goal-directed search for anything that can be specified in its declarative input language. Successful proofs correspond to unsuccessful searches, and vice-versa. This approach uses search by matching followed by planning with satisfiability search, and targets cycle budget limited goal-oriented code sequence in producing the near-optimal code sequence.

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

The meaning imparted to the terms below and throughout this paper is intended not as a limitation but merely to convey character or property relevant to the present invention. Where the terms have a special meaning or a meaning that is inapposite to accepted meaning in the art, the value of such meaning is not intended to be sacrificed to well-worn phrases or terms.

A. program, and program instructions: the term "program" is used in the standard sense of an executable specification of a digital computation; and a "program instruction" is an elementary component of the program that is directly executable by a digital computer.

B. optimal code sequence: is a sequence of program instructions that compute the values of a specified collection of goal terms in a minimum number of machine cycles.

C. near-optimal code sequence: is a sequence of program instructions that compute the values of the goal terms in almost the minimum number of cycles.

D. plan: a "plan" for computing a set of goal terms is determined by the selection of a method for computing each goal term. The method is determined by choosing a term whose value is equal to the value of the goal term, and selecting a cycle in which to compute each subexpression of the selected term. For example, suppose that one of the goal terms is 2*mem[reg6]. This is equal to mem[reg6]+mem[reg6]. One way to compute the goal term is to compute the value of mem[reg6] and then add that value to itself. The value of mem[reg6] can be computed by "load" instruction (in three cycles), and the add instruction (in one additional cycle).Thus this is an example of a four-cycle plan to compute 2*mem[reg6].

E. goal terms: the present invention produces near-optimal machine code to compute the values of a specified set of expressions. These expressions are called "goal terms". Their values are "goal term values".

F. clause: a "clause" is a disjunction of elementary facts.

G. asserting instances in the graph: in the matching phase of the invention, instances of general facts are selected and asserted into the E-graph. Facts that are asserted are either "elementary facts" or "clauses". Asserting a fact of the form A=B means combining the equivalence classes of the terms A and B. Asserting a fact of the form A!=B (A "not-equal" B) means recording in a table that the equivalence classes of the terms A and B have distinct values. These are two kinds of elementary facts.

H. harvesting a unit: asserting a clause E__1 OR E__2 OR . . . OR E_n is performed by making a record of the clause. If later elementary assertions make all but one of the E_i untenable, then the one that is left must be true and can be asserted. This is called "harvesting a unit".

I. a boolean satisfiability problem: is a problem of finding an assignment of truth values to boolean unknowns that makes a given boolean expression true (that satisfies it).

J. equivalence: if A$\Rightarrow$B and B$\Rightarrow$A (i.e., A$\Rightarrow$B$\wedge$A B$\Rightarrow$A where $\Rightarrow$denotes implies), then A and B are said to be equivalent, a relationship expressed symbolically as A$\Leftrightarrow$B. If A and B are equivalent by definition (i.e., A is defined to be B), that relationship is expressed symbolically as A$\equiv$B.

K. equivalence class: where an E-graph is a term-graph together with an equivalence relation of the nodes, an equivalence class is a maximal collection of nodes any two of which are equivalent.

L. goal directed search: goal-directed search improves over search by brute force enumeration. Brute force search strategies try every possible sequence of actions and reject those that don't work. Goal-directed search strategies achieve a much more focused search by working backwards from the goal.

As mentioned above, the invention provides a new way for generating near-optimal code sequences by applying technologies that would normally be used in automatic theorem proving to the problem of code generation. Specifically, the present invention is realized through refutation-based automatic theorem proving that is analogous to a general-purpose goal-directed search engine. Refutation-based proving attempts to prove a conjecture C by establishing the unsatisfiability of its negation $\neg$C. As will be further explained, this involves goal oriented matching followed by planning with satisfiability search. To produce a near-optimal code sequence of a program fragment to be executed on a target computer, it takes repeatedly invoking the automatic theorem proving. First, the invoked theorem proving determines a minimum number of machine cycles for which it establishes that the negation of a formalized mathematical conjecture—of the form, "code sequence exists for the target computer architecture which executes the program fragment in the minimum number of machine cycles"—is satisfiable. (if the negation of the formal conjecture is satisfiable, then the conjecture is false). Stated differently, the conjecture "no code sequence for the target computer architecture executes the program fragment within the cycle budget" is unprovable. Next, the invoked automatic theorem proving extracts the near optimal code from a counterexample implicit in the failed proof of the formalized mathematical conjecture for the minimum number of machine cycles.

In summary, here is the way the method works to generate efficient code for a program fragment P. To generate the efficient code for the program fragment P we would express in formal logic a conjecture of the form: "no program of the target architecture computes P in at most x cycles." We would then submit the conjecture to an appropriate automatic theorem prover. If the proof succeeds, then x cycles are not enough, and we would try again, with, say, x*2 cycles. If the proof fails, then embedded in the failed proof is an x-cycle program that computes P. We would then extract that program, and try again with x/2 cycles. Continuing with binary search, we would eventually find, for some K, a K-cycle program that computes P, together with a proof that K−1 cycles are insufficient: that is, an optimal program to compute P on the given architecture.

This approach is more easily described than implemented, and the remainder of the invention provides novel techniques that make the approach practical. If carried out naively, the conjectures submitted to the prover can become unwieldy, having difficult quantifier prefixes. The condition, for example, that P can be a program that "computes M" is: P and M being equivalent for all inputs (M is a machine-code sequence that produces on an input state i, a machine (or processor) state). Introducing an explicit quantification over all inputs makes the conjecture too complex in implementing the automatic theorem prover.

Working through an individual example shows that the solution is a simpler approach that avoids introducing the explicit quantifier over all inputs. Consider the need to prove that the action reg6:=2*reg7 is equivalent, for all inputs, to the machine program leftshift reg7,1,reg6

(Where we assume a three-operand assembly language with the destination given in the third argument.) The process to prove this equivalence is carried out by instantiating the algebraic identity ($\forall$x: 2.x=x<<1) with the instantiation x:=reg7. In the jargon of automatic theorem-proving, this is a proof by matching or goal oriented matching. Consequently, instead of introducing an explicit quantifier over all inputs, the present invention contemplates accepting the limitation that the only proofs one should consider of equivalence for all inputs between an action and a program are proofs by matching (or goal-oriented matching).

That is, for the kind of conjectures that code generation must prove or refute, the proof of equivalences for all inputs is handled by matching. The remaining proof is handled by propositional reasoning (or boolean satisfiability solving), also referred to herein as planning with a satisfiability search. The matcher finds all possible ways of computing the result. The boolean satisfiability solver selects fastest computing sequence from among these possible ways considering common sub-expressions, delay constraints of the target architecture, multiple issue constraints etc.

Processing Inputs to the Automatic Code Sequence Generator

In this implementation, the automatic code generator is embodied in a goal-directed superoptimizer. Typically, the input to the goal-directed superoptimizer is a program. For a sufficiently simple program fragment P, the equivalence of M and P for all inputs is essentially the universal validity of equality between two vectors of terms. The two vectors are the vector of terms that M computes and the vector of terms to be computed that P specifies. As noted, this equivalence is proved using matching.

To that end, the program is presented to the goal-directed superoptimizer in a language that includes language constructs, features and conditions. The language is a low-level language that can be close to C. This language is intended to be useful for writing the body of inner loops and critical subroutines of the program rather than directly writing any program of a significant size. Then, the program is translated by the goal-directed superoptimizer into an equivalent Assembly-language source code. Each procedure (and inner loop) in the program is converted into a set of a guarded multi-assignments (GMA) which are the inputs to the crucial loop of automatic code sequence generator (starting with the matcher; see FIG. 1a).

A multi-assignment (also known as a substitution) allows multiple simultaneous assignments. For example, the multi-assignment: (x,y):=(y,x) denotes a substitution operation that swaps x and y simultaneously (i.e., x becomes y, and y becomes x simultaneously).

The GMA is a subprogram of the form: Guard➞(targetlist):=(exprlist), in which Guard is a boolean expression, targetlist is a list of designators (also called L-values) and exprlist is a list of expressions (or R-values also referred to herein as "goal terms"). A GMA is a boolean guard expression together with a multi-assignment, which is a sequence of expressions to be computed and target locations in which the results are stored. Then, assuming L is an exit it label from a loop, the meaning of the GMA is:

if G then
   (targetlist):=(exprlist);
else
   goto L
end,

Namely, the code generated for a guarded multi-assignment, tests whether the guard is true, and, if it is, updates each target to the value of the corresponding expression. Hence, the multi-assignment is to be performed only if the guard expression is true.

The invention contemplates that a set of goal terms specifies what the corresponding near-optimal code sequence is supposed to do (they are the exprlist or R-values). The set of goal terms is the set of right-hand-side expressions of the guarded multi-assignment that is presented to the code sequence generator, together with the guard expression G. A programmer may enter, for example, a multi-assignment with goal terms at the right-hand-side as follows: reg6, reg7:=reg6*(reg7+8),6. Values of the set of goal terms (the values that computation of the goal terms is supposed to produce) are computed into targets listed by designators (the aforementioned targetlist, also called L-values). Thus, the left-hand-side of the multi-assignment indicates the list of designators which are the (register or memory) destinations of the result values. The output of the code sequence generator would be the near-optimal code sequence (program instructions or machine code) for computing the values of the goal terms and storing them in the specified destination registers. FIGS. 1a and 1b illustrate the automatic code generator and inner loop of the generation process (referenced as 10a and 10b).

To start the process, each procedure of the input (program) is converted by the goal-directed superoptimizer into a set of GMAs 20. Then, using the (refutation-based) search principle as modified by this invention to rely on matching and satisfiability search, the goal-directed superoptimizer uses this two-phased crucial inner subroutine (inner loop) to convert each GMA into near-optimal machine code. It is noted that although the factorization of a procedure body into a collection of GMAs can be advantageously optimized using various techniques, the present invention focuses primarily on improving the inner loop aspect of the goal-directed superoptimizer.

To compile the guarded multi-assignment (GMA), the matcher instantiates universal facts of the theory of relevant operators that are computable on the target architecture (note that definitions, lemmas, axioms, rules or universal facts are hereafter collectively referred to as "universal facts"). Preferably, the universal facts 22 are available in a file and are presented as an input to the code sequence generator so that it need not be changed when the universal facts are modified in any way (e.g., added or removed). As shown in FIGS. 1a and 1b, the matcher receives two sets of inputs, the GMA 20 and the universal facts 22. Matching is based on the theory that relevant instances of the universal facts justify different ways of computing the expressions (or goal terms) in the GMA.

Being the first phase in the inner loop of the automatic code sequence generator, once it receives the inputs, the matcher 24 encodes in a graph a summary of all the different ways of computing the expressions in the GMA (the goal terms). It is noted that matching can be implemented with any automatic theorem-proving technique without departing from the scope and spirit of the present invention. However, the preferred technique to use for the purposes of the present invention is matching in an e-graph, created from an augmented term graph (FIG. 1b). The e-graph helps to solve the problem of matching in the presence of equalities. The term graph is a data structure that is initialized to represent all the terms that must be computed by the code sequence to be generated, that is, all the goal terms (or R-values in the GMA). The term graph represents expressions (or terms), for example: (a+b)*c as shown in FIG. 2. To form the e-graph 26, the term graph 25 is augmented by an equivalence relation on the nodes of the term graph. Two nodes are equivalent if they have been deduced to be equal.

It is noted that according to a theorem of mathematical logic, any valid equivalence of the required sort is provable by matching, but the goal-directed superoptimizer's actual matcher does a bounded search whose level of effort is limited by heuristics. So in spite of the theorem it could happen that a valid and relevant equivalence would go undetected by the matcher. In this case, the goal-directed superoptimizer would miss a valid equivalence, and its result could fail to be optimal. However, the machine language it produces would still correctly compute the GMAs introduced at its input. This is the first reason for calling the output of the goal-directed superoptimizer "near-optimal" instead of "optimal".

After finding all the different ways of computing the expressions in the GMA, it remains to be determined whether any of these ways can be computed by the target architecture within a cycle budget K. Hence, the matcher passes the e-graph 27 on to the second phase of the automatic code generator (see FIG. 1a).

The second phase is the constraint generator 30 and solver 32, also known herein as the planning phase with satisfiability search. The other input to the second phase is a description of the target architecture 23 (including, latencies of various operations, multiple issue restrictions, etc.). The constraint generator 30 formulates this remaining question as a boolean satisfiability problem. Namely, for a fixed cycle budget, the constraint generator formulates as a boolean satisfiability problem the question of whether the expressions in the original GMA can be computed within the cycle budget using the target architecture. This problem is then given to a satisfiability solver 30. The boolean satisfiability solver (satisfiability search) is used to find a solution (the ways) or establish that no solution exists. The steps of the second phase, i.e., the constraint generation and satisfiability search steps, are repeated for various cycle budgets until an optimal machine program is found (i.e., until the minimum cycle solution is determined).

The matching and planning phases are described in greater detail below.

Matching

Broadly stated, matching is used to find many possible ways of computing the required result. One form of matching originated and is described in a doctoral dissertation entitled "Techniques For Program Verification," the Ph.D. thesis of Nelson, Gregory Charles, Stanford University, UMI Dissertation Services, 1980 (hereafter "Nelson's Dissertation") which is incorporated herein by reference. As described, matching is a heuristic process for choosing instances of universal facts that are relevant to a given problem. Thus, matching involves the process of choosing instances of universal facts that will make a given proof possible. For example, one universal fact is that multiplication distributes over addition:

$$\text{FOR ALL } x, y, z: (x+y)*z = x*z + y*z \qquad (1)$$

If one is trying to use (1) to show that a sum-times-a-difference is a difference-of-squares, i.e.,:

$$(a+b)*(a-b) = a^2 - b^2 \qquad (2)$$

a useful way to begin is to instantiate x to a, y to b, and z to (a−b), obtaining an instance of (1) that is relevant to (2). Namely:

$$(a+b)*(a-b) = a*(a-b) + b*(a-b).$$

Finding useful instances is called "matching" since a successful instance of the universally-quantified fact "matches" a "pattern" (like (x+y)*z) to a "goal term" (like (a+b)*(a−b)).

Since the number of possible ways in which the expressions in the input can be computed may be enormous (exponentially larger than the size of the expressions) it is important to choose a data structure carefully. Preferably, the matching phase uses the e-graph data structure (also introduced in Nelson's Dissertation). The e-graph is a conventional term directed acyclic graph (DAG) augmented with an equivalence relation on the nodes of the DAG (a directed acyclic graph contains no cycles). Two nodes are equivalent if the terms they represent are identical in value. Hence, the value of an equivalence class can be computed by computing any term in the class. And, having selected a term in the class, the values of each argument of the term likewise can be computed by selecting any term equivalent to the argument term, and so forth. Thus an e-graph with size of order n can represent on the order of $2^n$ distinct ways of computing a term of size n.

The machine code for a GMA is required to evaluate the boolean expression that is the guard of the GMA, and it is also required to evaluate the expressions on the right side of the multi-assignment statement. These expressions are the goal expressions (or goal terms), since the essential goal of the required machine code is to evaluate them.

Figure 3:
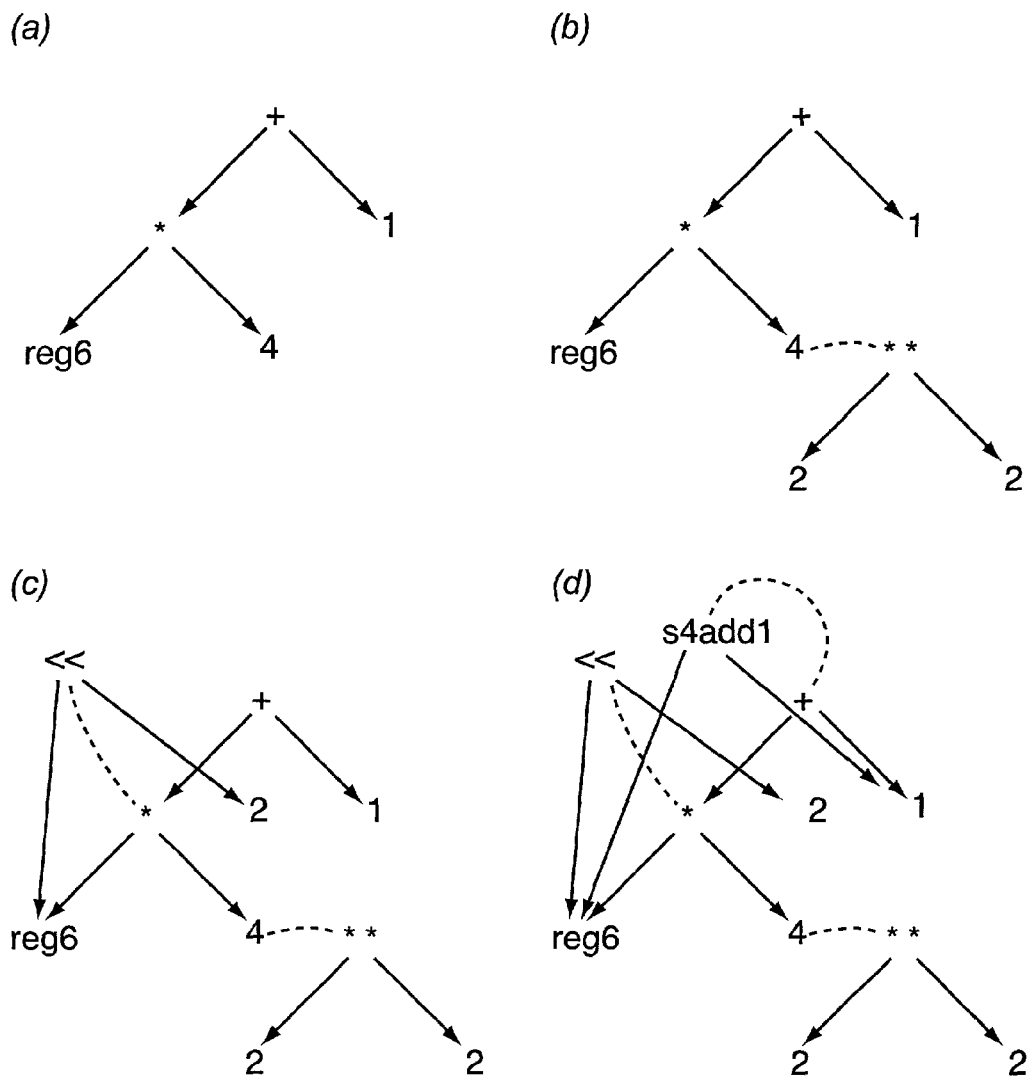
FIGS. 3a–d illustrate term graphs (in this case E-graphs) in successive phases of the matching process.

Typical GMAs have several goal terms, but FIG. 3 illustrates the matcher for the artificially simplified situation of a single goal term, namely reg6*4+1. The first step is to construct a graph that represents all the goal terms. FIG. 3a shows the initial graph of this simple example. This e-graph is a conventional DAG in which a term of the f($t_1, t_2, \ldots, t_n$) is represented by a node labeled f with an outgoing sequence of edges pointing to the nodes that represent the t's. In this case, if no matching were performed at all, so that FIG. 3a were the final e-graph, the only way to compute the goal term would be by a multiply followed by an add.

For a particular architecture targeted by a particular goal-directed superoptimizer, the relevant operations (e.g., algebraic, boolean, etc.) are the operations of the goal-directed superoptimizer source language together with the operations that can be computed by the target architecture. For example, operations computable by a machine with the target architecture include all its machine operations. Thus, the matcher relies on a background file that declares relevant and useful universal facts about the relevant operations (e.g., 22 in FIG. 1b).

The matcher repeatedly transforms the e-graph by instantiating such universal facts and modifying the e-graph accordingly. This is repeated until a quiescent state is reached in which the e-graph records all instances of all relevant and useful universal facts from the background file. In the example of FIG. 3, the first relevant and useful universal fact is: $4 = 2^2$. When this universal fact is instantiated, the e-graph is changed by adding a new node to represent the term $2^2$ (or 2**2) and adding this new node to the equivalence class of the existing node or "4". FIG. 3b shows the result of this transformation. (Dashed edges are used to connect nodes that are equivalent.)

It is noted that when a processor such as the Alpha™ does not have an instruction for computing **, this match does not introduce any direct new way of computing the goal term. Hence, if matching terminated with the e-graph of FIG. 3b, the only way to compute the goal term would still be by the same multiply and add sequence available already in the initial graph. In such case, this change to the e-graph may appear useless. But, as will become evident, it enables new matches.

Specifically, matching now continues by finding a relevant and useful instance of the universal fact: $\forall k, n :: k*2^n = k<<n$, namely the instance with (k,n):=(reg6,2). (An ordinary matcher would fail to match the pattern k*2**n against the node reg6*4, in the term DAG because the node labeled "4" is not of the form $2^n$. However, an e-graph matcher will search the equivalence class and find the node 2**2, and the match will therefore succeed.) The resulting e-graph is shown in FIG. 3c. If matching were terminated at this point, then in addition to the multiply-add sequence there would be a shift-and-add sequence (which is faster and therefore would probably be selected).

Finally, assuming that a processor, such as the Alpha™, contains an instruction that scales by four and adds (in the Alpha™ processor this instruction is the "s4addl"). In that case, the background facts include the universal fact: $\forall k, n :: k*4 + n = s4addl(k, n)$. When the matcher instantiates this with (k,n):=(reg6,1) and updates the e-graph, the result is the graph shown in FIG. 3d. This adds a new possibility for computing the goal term using a single s4addl instruction (which is superior to the other, previously considered ways).

The foregoing example raises a few issues that are important to note. First, the order in which the matches would occur in this example might very well be different than in the order described. That is, s4addl could have been introduced immediately. However, the << node could not be introduced until the equality of 4 with 2**2 was introduced.

Second, many conventional matchers are actually rewriting engines in the sense that they directly rewrite a term into a new form; namely, recursively rewriting sub-expressions before rewriting a root expression. For example, they might rewrite n*2 into n<<1. Such rewriting engines would be unlikely to rewrite 4 as $2^2$, since the latter term is not an efficient way to compute the former. Similarly, since the pattern for the universal fact involving s4addl most naturally involves multiplication by four, not left-shifting by two, a rewriting engine that produced the fairly efficient reg6<<2 might miss the most efficient version with s4addl.

Although possibly counterintuitive at first, to reach the optimal expression by a sequence of elementary rewrites may require rewriting some sub-terms in ways that reduce efficiency rather than improve it. In general, a transformation that improves efficiency may cause the failure of subsequent matches that would have produced even greater gains. These are well-known and thorny problems for rewriting engines. The e-graph doesn't suffer from these problems. This is because with the e-graph, instead of rewriting A as B, A=B are recorded in the data structure. Leaving both A and B around allows the use of both for future matching and as candidates for the final selection of instructions.

Finally, the attractive features of the above-mentioned e-graph approach are still costly. Matching in an e-graph is more expensive than matching a pattern against a simple term DAG. Also, many matches are required to reach quiescence. (Many more terms remain to be added to the e-graph of FIG. 3d before quiescence is reached, for example $$addq(leftshift(1,0),mulq(4,reg6)).$$

Nevertheless, overall, the inner loop of the automatic code generator seems to be efficient enough to be useful. And when it is painfully slow, the satisfiability solver is more often to blame than the matcher.

So far we have only considered universal facts that are (quantified or unquantified) equalities between terms. An equity is a universal fact of the form T=U for two terms T and U. Two other kinds of universal facts that the matcher uses are (quantified or unquantified) distinctions and clauses. As before, quantified universal facts are transformed into unquantified universal facts. Thus, as with equalities, quantified distinctions and clauses are transformed into the corresponding unquantified distinctions and clauses by finding heuristically relevant instances. Therefore, it suffices to explain how the matcher uses unquantified distinctions and clauses.

A (binary) distinction is a universal fact of the form T≠U for two terms T and U. A distinction T≠U is asserted in the e-graph by recording the constraint that the equivalence classes of T and of U are uncombinable. Equalities and Distinctions are collectively called literals. A clause, is a disjunction ("OR") of literals. A clause is a universal fact of the form $L_1$ OR $L_2$ OR . . . OR $L_n$ where the L's are literals (A OR B denotes the disjunction of the boolean values A and B). An unquantified clause is used by recording it in a data structure and, then, any time any of its literals becomes untenable, the untenable literal, $L_i$, is deleted from the recorded clause. Furthermore, if the deletion of the untenable literal, $L_i$, from a recorded clause leaves the clause with a single literal, then that lone literal is asserted. An equality T=U is untenable if the equivalence classes of T and of U have been constrained to be uncombinable. A distinction T≠U is untenable if T and U are in the same equivalence class. For example, a standard file of background universal facts (e.g., 22 in FIG. 1b) records fundamental facts about the functions 'select' and 'store' that represent reads and writes of arrays. One of these fundamental facts is the select-store axiom, which says that writing element i of an array a doesn't change any element with an index j different from i:

$$(\forall a,i,j,x::i=j \text{ OR } select(store(a,i,x)j))=select(a,j).$$

If an action involved storing x to address p and loading from address p+8, then the e-graph would include the two terms $$store(mem,p,x) \text{ and } select(mem,p+8).$$

Therefore the body of the select-store axiom would be instantiated by (a,i,j):=(mem,p,p+8), causing the matcher to make a record of the unquantified clause $$p=p+8 \text{ OR } select(store(mem,p,x),p+8)=select(mem, p+8).$$

It can be then established that the literal p=p+8 will be untenable and it will be deleted. This leads to the assertion of the equality $$select(store(mem,p,x),p+8)=select(mem,p+8).$$

The presence of this equality in the e-graph gives the code generator the option of doing the load and store in either order.

Satisfiability Solving

After the matcher has introduced new terms into the e-graph, and merged equivalence classes in the e-graph, it is a sound assumption that the e-graph represents all possible ways of computing the terms that it represents. More precisely, it is sound to assume that this will be true if the background universal facts include a complete axiomatization of the first order theory of the relevant operations and if the matching phrase is allowed to run long enough. In order to obtain optimal code, it remains to formulate a conjecture of the form:

"No program of the target architecture computes the values of the goal terms within K cycles"

where K is a specified literal integer constant. Happily, this can be formulated in propositional reasoning, so that it can be tested with a satisfiability solver. The exact details are somewhat architecture-dependent, but the basic idea remains the same. To illustrate the basic idea a machine without multiple issue is assumed, so that at most one instruction is issued per cycle. The operations appearing in the e-graph include machine operations and general operations. A machine operation can be directly computed by the target architecture. General operations are allowed in the input (or in the file of universal facts) but are not computable directly by the machine. (The matching example in the previous section used the general operation ** so that universal facts (in that case, powers of two) could be expressed conveniently.) Accordingly, a term (that is, a node of the e-graph) is defined as a machine term if it is an application of a machine operation, and a non-machine term otherwise.

As noted, the general step is reduced to the problem of boolean satisfiability search, which is NP-complete, but for which many satisfactory heuristics are known. And, from the boolean solution (which reveals which operations are launched on which cycles) a machine program can be extracted. Hence, the problem of the general step (existence of a machine program) is formulated as a boolean satisfiability problem. To that end, a number of boolean unknowns and their related constraints are now introduced. These unknowns and constraints have the property that there is a one-to-one correspondence between solutions of the boolean satisfiability problem and solutions to the general step. Accordingly, for each cycle i (from 0 to K−1) for each machine term T, and for each equivalence class Q, the boolean unknowns are introduced as follows:

L(i,T): denotes that in the desired machine program, the computation of T is launched at the beginning of cycle i.

A(i,T): denotes that in the desired machine program, the computation of T is completed at the end of cycle i.

B(i,Q): denotes that the desired machine program has computed the value of equivalence class Q by the end of cycle i.

In terms of these boolean unknowns, constraints can be formulated under which a K-cycle machine program exists that computes all the goal terms. That is, every goal term's value is to be computed within the budget of K cycles. There are four basic constraints.

First, in writing $\lambda(T)$ for the latency of the term T, that is, the number of cycles required to apply the root operator of T to its arguments, it is observed that the interval of time occupied by the computation of T consists of $\lambda(T)$ consecutive cycles. Therefore:

$$\bigwedge_{i,T}(L(i, T) \equiv A(i + \lambda(T) - 1, T)).$$

Second, it is observed that in a valid code sequence, an operation cannot be launched until its arguments have been computed. Therefore, writing args(T) for the set of equivalence classes of the top level arguments of a term T, we deduce that the following constraint must be satisfied by the L's and the B's:

$$\bigwedge_{i,T,Q}(L(i, T) \wedge Q \in args(T)) \Rightarrow B(i-1, Q)\bigg).$$

Third, the only way to compute the value of an equivalence class Q by the end of cycle i is by computing the value of one of its machine terms T at the end of some cycle $j \leq i$. Therefore:

$$\bigwedge_{i,Q}(B(i, Q) \equiv V_{j,T} j \leq i \wedge T \in Q \wedge A(j, T)).$$

Fourth, letting G denote the set of equivalence classes of goal terms, each of these equivalence classes must be computed within K cycles. When numbering cycles from zero, 'within K cycles' would be by the end of cycle K−1:

$$\bigwedge_{Q \in G} B(K-1, Q).$$

More constraints than those shown above are needed (although they will not be provided herein). In essence, constrains need to be added until the boolean unknowns are so constrained that any solution to them corresponds to a K-cycle machine program that computes the goal terms.

For a fixed e-graph and a fixed cycle budget, these conditions are explicit propositional constraints on a finite set of boolean unknowns. The assertion that 'no K-cycle machine program exists' is equivalent to the assertion that 'their conjunction is unsatisfiable'. This is a conjecture that can be tested with the satisfiability solver. A refutation of this conjecture is an explicit assignment of the boolean values to the L's, A's and B's. The L's that are assigned true by the solver determine which machine operations are launched at each cycle, from which the required machine program can be retrieved. Thus the machine program can be extracted from the refutation of the conjecture.

This section is concluded with a few remarks about latencies. The approach implemented in the invention requires that the latency $\lambda(T)$ of each term T be known to the code generator. For ALU operations, this requirement is not problematical, but for memory accesses it may at first seem to be a showstopper. Certainly an ordinary code generator cannot statically predict the latencies of memory accesses. But the scenario in which the invented code generator is designed to be used is not necessarily the scenario in which an ordinary compiler is used. The scenario is an inner loop or crucial subroutine of a program whose performance is important enough to warrant hand-coding in machine language. In this scenario, the first step is to use profiling tools to determine which memory accesses miss in the cache (and how many levels of cache are missed). Having found this information, the invented code generator allows the programmer to annotate its input with information about the latency of each memory access.

Since the information gleaned from profiling is statistical, not absolute, one may still be in trouble if the correctness of the generated code depended on the accuracy of the latency annotations. However, precisely because caching makes memory latencies unpredictable statically, any reasonable modem processor (including both the Alpha™ and the Itanium™) includes hardware to stall or replay when necessary. Latency annotations are important for performance but not for correctness, since the code generated will be correct even if the annotations are inaccurate. Thus, one can expect some stalls or replay traps on the first few iterations of an optimized inner loop (or critical subroutine). However, since statistical information about inner loops is quite reliable, the loop will soon settle into the optimal computation that was modeled by the boolean constraints. The statistical nature of profiling information is the second reason that the output of the automatic code sequence generator is called "near-optimal" instead of "optimal".

Additional Constraints

The satisfiability constraints in the previous section were simplified by the assumption of a single-issue machine, since the cycle index i could also be thought of as an index in the instruction stream. But the same approach easily accommodates a multiple instruction architecture where cycle indexes and instruction indexes both appear and must be carefully distinguished.

Some expressions (in particular, memory accesses) on the right side of a guarded multi-assignment may be unsafe to compute if the guard expression is false. Therefore the goal-directed superoptimizer generates satisfiability constraints that force the guard to be tested before any such expressions are evaluated. It is straightforward to add additional propositional constraints on the boolean unknowns to enforce this order.

The expressions on the right side of a guarded multi-assignment may use the same targets that it updates; for example, (reg6,reg7):=(reg6+reg7,reg6).

In this case, the final instruction that computes the reg6+reg7 may not be able to place the computed value in its final destination. In the worst case, we may be forced to choose between adding an early move to save an input that will be overwritten by the rest of the code sequence or computing a value into a temporary register and adding a late move to put it finally into the correct location. On multiple-issue architectures the choice between these two alternatives may be non-obvious and would slow down a human programmer, but the automatic code sequence generator in the goal-directed superoptimizer encodes the choice into the boolean constraints where it becomes just one more bit for the solver to determine.

The ordering of procedure calls is more constrained than the ordering of other operations, because in general, a procedure call is assumed to both modify and read the memory. This circumstance leads to additional constraints that are also encoded in the propositional reasoning.

SUMMARY

In summary, the present invention contemplates an automatic tool, computer product and method for producing near-optimal machine code sequences by using two techniques previously employed in automatic theorem proving, matching and satisfiability search. Notably also, the present invention targets a goal-oriented, cycle budget limited code sequence in producing the near-optimal code sequence. The invention is particularly useful for generating near-optimal code sequences in inner loops, crucial subroutines, and device drivers.

The invention provides benefits that can be readily appreciated by a person of ordinary skill in the relevant art. For example, goal-directed search improves over search by brute force enumeration. Brute force search tries all possibilities, eventually finding the plan that works after rejecting an enormous number that do not. Goal-directed search strategies achieve a much more focused search by working backwards from the goal. By continuing to work backwards, the search comes up with a plan that works, without having to consider all the plans that don't work (although, at times, some backtracking will still be required.) A central idea of the invention is to harness the goal-directed search of a satisfiability solver to the problem of code generation, since satisfiability solvers using goal-directed search are readily available, and propositional reasoning is sufficiently expressive that it is entirely straightforward to reduce the code generation problem to the boolean satisfiability problem.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A method for producing, for a target computer architecture and a program fragment, a near-optimal code sequence for executing the program fragment on the target computer, comprising:
    repeatedly invoking an automatic theorem prover for plural cycle budgets to
        determine a minimum cycle budget that is the lowest of any cycle budget K for which a formalized mathematical conjecture that no code sequence for the target computer architecture executes the program fragment within the cycle budget K is unprovable by the automatic theorem prover, and
        extract the near optimal code sequence from a counterexample implicit in the failed proof of the formalized mathematical conjecture for the minimum cycle budget.
2. The method of claim 1, wherein the automatic theorem prover is two-phased, the two phases including
    instantiating facts by a matcher about machine operations that are computable by a machine with the target computer architecture and facts about non-machine operations, followed by
    a boolean satisfiability search.
3. The method of claim 1, wherein the program fragment specifies a vector of expressions to be computed together with one or more of
    a vector of target destinations into which the values of the expressions are to be placed, and
    a guard and label pair, the guard being a given boolean expression that determines whether the program fragment is to be executed as described or whether, instead, control is to be transferred to the label.
4. The method of claim 1, wherein, during the invocations of the automatic theorem prover, the minimum number of machine cycles for each successive invocation is set to a value so as to bisect the interval of remaining possible values of the minimum number of machine cycles.
5. The method of claim 2, wherein the instantiated facts from the matcher are asserted into an e-graph which is formed from a term graph augmented by an equivalent relation connecting terms known to be equal.
6. The method of claim 2, wherein the satisfiability search operates on a collection of boolean unknowns that encode a set of conjectured code sequences for a machine with the target computer architecture, each of these code sequences being defined in terms of a set of machine operations initiated in each cycle.
7. The method of claim 6, wherein the instantiated facts from the matcher are asserted into an e-graph which is formed from a term graph augmented by an equivalent relation connecting terms known to be equal, and wherein the encoding is performed such that, for each term of the e-graph and each cycle i of the minimum number of machine cycles for a particular invocation, there is a particular boolean unknown that indicates whether the conjectured code sequence performs a computation of the root operation of the term during cycle i.
8. The method of claim 6, wherein the boolean unknowns encode boolean constraints suitable for the target computer architecture.
9. A method for producing, for a target computer architecture and a program fragment, a near-optimal code sequence for executing the program fragment on the target computer, comprising:
    repeatedly invoking an automatic theorem prover to prove unsatisfiable a formalized mathematical conjecture that, for a cycle budget K, no code sequence for the target computer architecture executes the program fragment within that cycle budget K,
    wherein if the proof fails, a K-cycled program computing the program fragment is embedded in the failed proof,
    wherein the near-optimal code sequence is found, and the invocation need not be repeated, when it is established that both the K-cycled program computes the program fragment and a cycle budget K−1 is insufficient in that the cycle budget K is minimum, the K-cycled program being extracted as the near-optimal code sequence, and
    wherein, if the near-optimal code sequence is not found in a present invocation, for a next revocation of the automatic theorem prover if the proof succeeds the cycle budget K is doubled (K:=K*2) and if the proof fails the cycle budget is bisected (K:=K/2) and a new K-cycled program computing the program fragment that is embedded in the failed proof is extracted.

10. The method of claim 9, wherein the program fragment is presented to the automatic theorem prover as a set of guarded multi-assignments each including a guard and a multi-assignment that can be performed only when its respective guard is true.

11. The method of claim 10, wherein the set of guarded multi-assignments is compiled by instantiating universal facts about operators including machine and non-machine terms, wherein each instance of operators provides a way for computing a corresponding multi-assignment.

12. The method of claim 11, wherein the ways for computing the multi-assignments are encoded in a graph.

13. The method of claim 12, wherein the graph is an equivalence graph (e-graph) formed as a directed acyclic graph.

14. The method of claim 12, wherein the graph is transformed in the presence of equalities between nodes.

15. The method of claim 12, wherein the graph is submitted for the extraction of the near optimal code sequence, the extraction using a description of the target computer architecture for formulating a boolean satisfiability problem a solution of which is found for the minimum cycle budget K via a satisfiability search.

16. The method of claim 12, wherein for a multi-assignment of the size n, an e-graph with a size order of n represents $2^n$ distinct ways of computing the multi-assignment.

17. The method of claim 9, wherein the extraction of the near optimal code sequence is done from a formulation of a boolean satisfiability problem using a set of boolean unknowns that are one-to-one corresponding to a solution of the boolean satisfiability problem, the solution corresponding to a budget-cycle machine program where the budget is the minimum cycle budget K.

18. The method of claim 1 wherein the automatic theorem prover performs refutation-based automatic theorem proving.

19. The method of claim 9 wherein the automatic theorem prover performs refutation-based automatic theorem proving.

20. A method for automatic generation of a near-optimal code sequence for execution on a computer, comprising:
   applying automatic theorem-proving to a code sequence generator, including
      introducing a multi-assignment to the code sequence generator,
      producing, by the code sequence generator based on the multi-assignment, a number of possible plans for creating the near-optimal code sequence, and
      performing, by the code sequence generator, planning with a satisfiability search to select an optimal plan from among the possible plans for automatically producing the near-optimal code sequence, wherein performing the planning with the satisfiability search is repeated a plurality of times for plural machine cycle budgets to find the optimal plan associated with a predetermined machine cycle budget.

21. A method as in claim 20, wherein the multi-assignment includes goal terms that specify what result the near-optimal code sequence is expected to produce, and wherein the applying automatic theorem proving further includes initializing a term graph with the goal terms whereby nodes of the term graph receive the goal terms.

22. A method as in claim 21, further comprising:
   introducing instances of universal facts that are relevant to the near-optimal code sequence, and
   augmenting the term graph with equivalence relations between the goal terms and corresponding instances of the universal facts by matching the universal facts against the term graph.

23. A method as in claim 21, wherein values of the goal terms are computed into registers of the computer, the registers being specified in the multi-assignment.

24. A method as in claim 22, wherein the term graph is augmented by the equivalence relations on its nodes to produce an equivalence graph (e-graph).

25. A method as in claim 24, further comprising transforming the e-graph into a transformed e-graph that is provided to the planning with the satisfiability search.

26. A method as in claim 22, wherein the satisfiability search produces the near-optimal code sequence for achieving values corresponding to the goal terms.

27. A method as in claim 21, wherein the near-optimal code sequence is created from the term graph by iteratively solving a satisfiability problem with the machine cycle budgets until an optimal code sequence is found.

28. A method as in claim 22, wherein the universal facts are available in a file and are introduced as an input to the code sequence generator so that the universal facts can be changed without changing the code sequence generator.

29. A method as in claim 22, wherein the universal facts express properties of operators in the goal terms.

30. A method as in claim 23, wherein the term graph is initialized with node terms representing the goal terms.

31. A method as in claim 20, wherein the predetermined machine cycle budget is a minimal machine cycle budget.

32. A method as in claim 20, wherein the satisfiability search is a goal-directed search.

33. A code sequence generation tool for automatic generation of a near-optimal code sequence executable on a computer, comprising:
   an input capable of receiving a multi-assignment;
   a matcher responsive to the multi-assignment and producing, via matching of the multi-assignment and facts regarding operators computable in the computer, a number of possible plans for creating the near-optimal code sequence; and
   a planner configured to select via a satisfiability search an optimal plan from among the possible plans produced by the matcher, the optimal plan corresponding to the near-optimal code sequence,
   wherein the code sequence generation tool is configured to invoke the matcher and the planner thereby implementing automatic theorem-proving for automatically generating the near-optimal code sequence.

34. A code sequence generation tool as in claim 33 being further configured for producing the optimal code sequence using a goal-oriented, cycle budget limited code sequence in generating the near-optimal code sequence.

35. A code sequence generation tool as in claim 33 wherein the planner includes a constraint generator and a solver, the code sequence generation tool further comprising an input configured for introducing architectural constraints to the constraint generator which the constraint generator uses in creating a set of boolean unknowns for the solver.

36. A code sequence generation tool for automatic generation of a near-optimal code sequence executable on a computer, comprising:
   an input capable of receiving a multi-assignment;
   matching means responsive to the multi-assignment and producing, via matching of the multi-assignment and facts regarding operators computable in the computer, a number of possible plans for creating the near-optimal code sequence; and planning means configured to select via a satisfiability search an optimal plan from among the possible plans produced by the matching means, the optimal plan corresponding to the near-optimal code sequence, wherein the code sequence generation tool is configured to invoke the matching means and the planning means thereby implementing automatic theorem-proving for automatically generating the near-optimal code sequence.

37. The method of claim 20, further comprising executing the code sequence generator as a computer-executed code sequence generator.

38. The code sequence generation tool of claim 33, wherein the planner is invocable a plurality of times for plural machine cycle budgets, the planner to select the optimal plan associated with a minimum machine cycle budget from among the plural machine cycle budgets.

39. The code sequence generation tool of claim 36, wherein the planning means is invocable a plurality of times for plural machine cycle budgets, the planner to select the optimal plan associated with a minimum machine cycle budget from among the machine cycle budgets.

40. A method of producing a near-optimal code sequence for at least a fragment of a program executable on a computer comprising:

inputting expressions corresponding to the fragment of the program to a computer-executable code sequence generator;

generating, by the code sequence generator based on the input expressions and facts regarding operators computable in the computer, a data structure representing plural ways of computing the expressions; and performing a satisfiability search by the code sequence generator to select one of the ways as an optimal solution associated with a minimum machine cycle budget, the optimal solution corresponding to the near-optimal code sequence.

41. The method of claim 40, wherein performing the satisfiability search is repeated plural times for plural machine cycle budgets.

42. A computer-readable medium embodying computer program code configured to cause a computer to generate a near-optimal code sequence for at least a fragment of a program, comprising:

inputting expressions corresponding to the fragment of the program to a code sequence generator;

generating, by the code sequence generator based on the input expressions and facts regarding operators computable in a computer, a data structure representing plural ways of computing the expressions; and performing a satisfiability search by the code sequence generator to select one of the ways as an optimal solution associated with a minimum machine cycle budget, the optimal solution corresponding to the near-optimal code sequence.

43. The computer-readable medium of claim 42, wherein performing the satisfiability search is repeated plural times for plural machine cycle budgets.

* * * * *

UNITED STATES PATENT AND TRADEMARK OFFICE
CERTIFICATE OF CORRECTION

PATENT NO. : 7,036,115 B2 Page 1 of 1
APPLICATION NO. : 09/990542
DATED : April 25, 2006
INVENTOR(S) : Charles Gregory Nelson It is certified that error appears in the above-identified patent and that said Letters Patent is hereby corrected as shown below:

In column 5, line 16, delete "A=>B∧A B=>A" and insert -- A=>B ∧ B=>A --, therefor.

In column 7, line 17, after "exit" delete "it".

In column 14, line 24, delete "modem" and insert -- modern --, therefor.

In column 19, line 27, in Claim 40, after "computer" insert -- , --.

Signed and Sealed this

Thirty-first Day of March, 2009

JOHN DOLL
*Acting Director of the United States Patent and Trademark Office*